(12) United States Patent
Ang et al.

(10) Patent No.: US 8,783,654 B2
(45) Date of Patent: Jul. 22, 2014

(54) FLUID INTERCONNECT MEMBER, FLUID INTERCONNECT SYSTEM, AND METHODS THEREOF

(75) Inventors: Kok Seng Ang, Singapore (SG); Peng Yang Chan, Singapore (SG)

(73) Assignee: Hewlett-Packard Development Company, L. P., Houston, TX (US)

( * ) Notice: Subject to any disclaimer, the term of this patent is extended or adjusted under 35 U.S.C. 154(b) by 947 days.

(21) Appl. No.: 12/732,718

(22) Filed: Mar. 26, 2010

(65) Prior Publication Data

US 2011/0232784 A1  Sep. 29, 2011

(51) Int. Cl.
*F16K 51/00* (2006.01)

(52) U.S. Cl.
USPC .............................. 251/149; 347/85; 347/86

(58) Field of Classification Search
CPC .. B41J 2/17553; B41J 2/17503; B41J 2/1752; B41J 2/17523
USPC ......... 251/149, 149.1, 149.8, 147; 347/85, 86
See application file for complete search history.

(56) References Cited

U.S. PATENT DOCUMENTS

| | | | | |
|---|---|---|---|---|
| 4,929,235 A | * | 5/1990 | Merry et al. | 604/167.04 |
| 5,064,416 A | * | 11/1991 | Newgard et al. | 604/167.03 |
| 5,102,395 A | * | 4/1992 | Cheer et al. | 604/167.03 |
| 5,125,903 A | * | 6/1992 | McLaughlin et al. | 604/247 |
| 5,269,764 A | * | 12/1993 | Vetter et al. | 604/167.04 |
| 5,549,576 A | * | 8/1996 | Patterson et al. | 604/247 |
| 5,702,370 A | * | 12/1997 | Sylvanowicz et al. | 604/256 |
| 5,721,576 A | * | 2/1998 | Barinaga | 347/85 |
| 5,815,182 A | * | 9/1998 | Otis et al. | 347/85 |
| 6,024,729 A | * | 2/2000 | Dehdashtian et al. | 604/256 |
| 6,162,206 A | * | 12/2000 | Bindokas et al. | 604/533 |
| 6,257,715 B1 | * | 7/2001 | Thielman et al. | 347/92 |
| 6,632,200 B2 | * | 10/2003 | Guo et al. | 604/247 |
| 6,648,460 B2 | * | 11/2003 | Gonzales | 347/86 |
| 6,712,458 B2 | * | 3/2004 | Hatasa et al. | 347/86 |
| 6,918,500 B2 | * | 7/2005 | Okiyama | 215/247 |
| 6,945,642 B2 | * | 9/2005 | Yamamoto et al. | 347/86 |
| 7,004,574 B2 | * | 2/2006 | Neese et al. | 347/85 |
| 8,231,596 B2 | * | 7/2012 | Okiyama | 604/408 |

* cited by examiner

*Primary Examiner* — John K Fristoe, Jr.
*Assistant Examiner* — Andrew J Rost (57) ABSTRACT

A method of assembling a fluid interconnect system includes inserting a septum into a septum receiving chamber of the fluid interconnect system, placing the septum in a radial-compressed state during the inserting the septum into the septum receiving chamber, and maintaining the septum in the radial-compressed state in the septum receiving chamber.

18 Claims, 8 Drawing Sheets

Ultrasonic Welding

Fig. 6F

FLUID INTERCONNECT MEMBER, FLUID INTERCONNECT SYSTEM, AND METHODS THEREOF

BACKGROUND OF THE DISCLOSURE

Fluid interconnect member selectively communicates with an image forming apparatus to supply fluid, for example, from a fluid supply to the image forming apparatus. Fluidic interconnect member may be embodied as part of a fluid container such as an ink container and include a septum. The septum selectively receives a needle of the image forming apparatus such that fluid is supplied from the fluid supply into the needle through the fluid interconnect member to the image forming apparatus.

DESCRIPTION OF THE DRAWINGS

Exemplary non-limiting embodiments of the general inventive concept are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

The present general inventive concept is directed towards a fluid interconnect member, a fluid interconnect system and methods thereof. Conventional fluid interconnect members include septums to receive a needle of an image forming apparatus. The septums of such conventional fluid interconnect members are placed in an axial-compressed state by installation of a septum cap on the septum and a top portion of the fluid interconnect member. For example, the septum cap may be mechanically crimped in an axial direction and engage the septum and the top portion of the fluid interconnect member. At times, however, the axially-compressed septum may be subjected to leaking of air and/or fluid, for example, around the needle when the needle engages the septum. The present general inventive concept relates to a septum being placed and maintained in a radial-compressed state in a septum receiving chamber of a fluid interconnect member. Thus, the radial-compressed state of the septum of the present general inventive concept engages the needle and prevents leakage there between.

Figure 1:
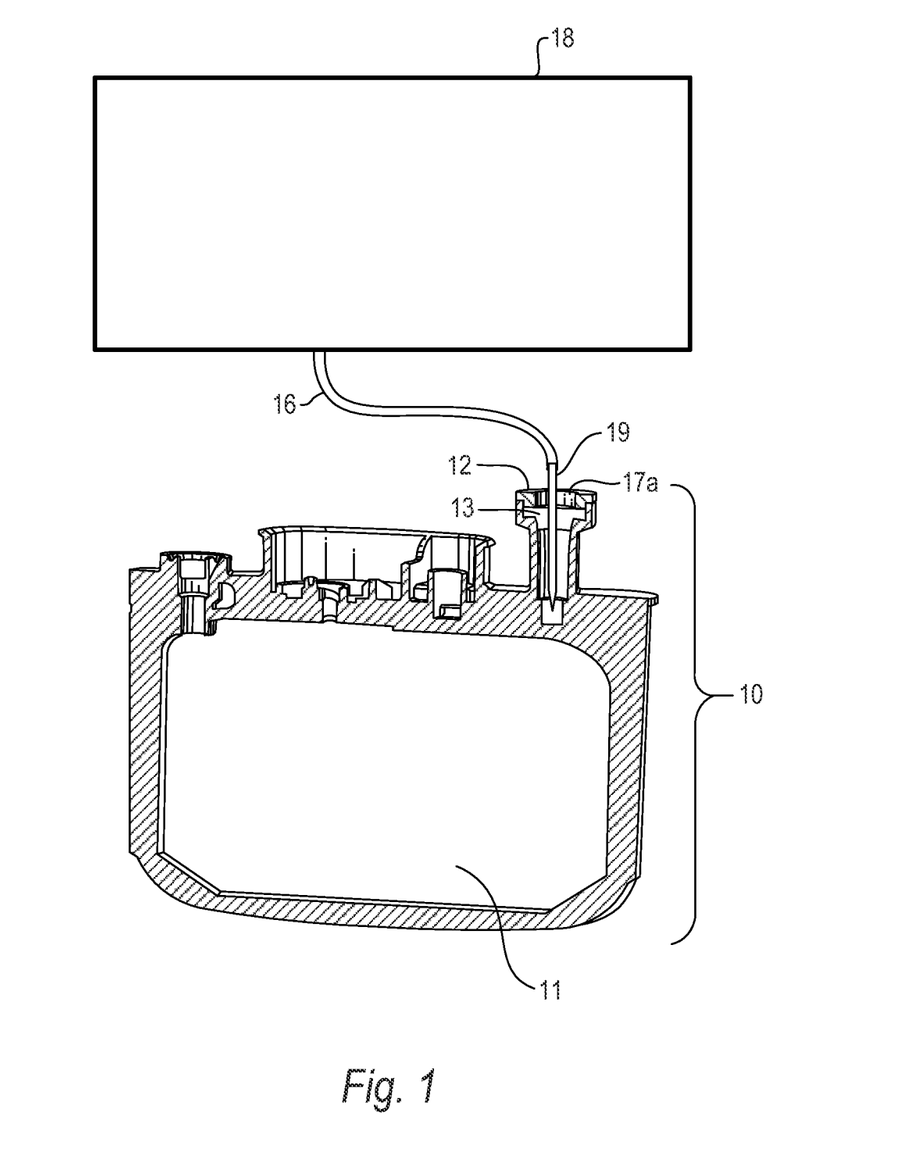
FIG. 1 is an illustrative view of an image forming apparatus coupled to a fluid interconnect system according to an exemplary embodiment of the present general inventive concept.

FIG. 1 is an illustrative view of an image forming apparatus coupled to a fluid interconnect system according to an exemplary embodiment of the present general inventive concept. Referring to FIG. 1, in the present example, an image forming apparatus 18 engages a fluid interconnect system 10 in order to obtain fluid from a fluid supply 11 of the fluid interconnect system 10. In this example, a needle 19 of the image forming apparatus 18 is passed through a needle receiving portion 17a of a septum cap 12 and a needle receiving portion 17b (FIG. 2A) of a septum 13 to obtain fluid from the fluid supply 11 therein. In this example, the fluid passes from the fluid supply 11 to the image forming apparatus 18 through the needle 19 and a conduit 16 of the image forming apparatus 18. In the present example, the fluid may be ink, the fluid interconnect system 10 may be an ink container, and the image forming apparatus 18 may be an inkjet printer.

Figure 2A:
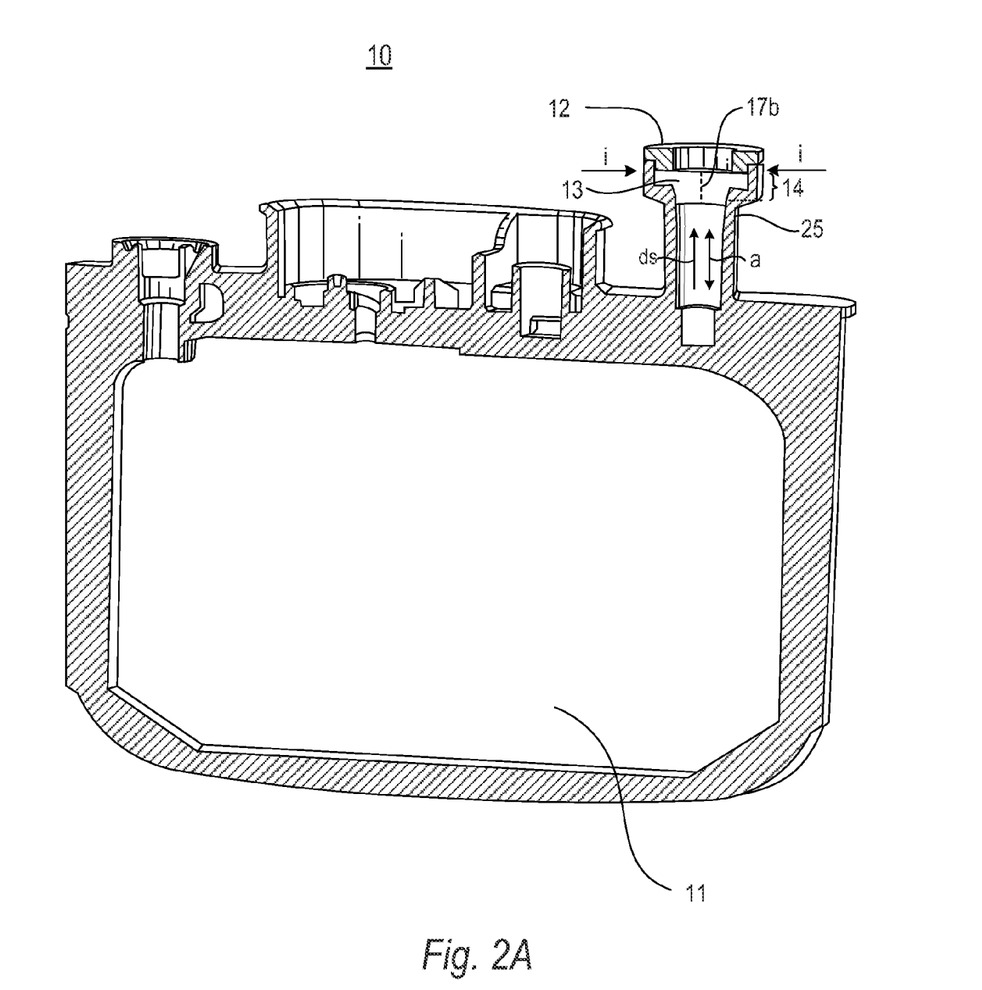
FIG. 2A is a cross-sectional view illustrating a fluid interconnect system usable with an image forming apparatus according to an exemplary embodiment of the present general inventive concept.

FIG. 2A is a cross-sectional view illustrating a fluid interconnect system usable with an image forming apparatus according to an exemplary embodiment of the present general inventive concept. Referring to FIG. 2A, in the present example, a fluid interconnect system 10 includes a housing member 25 extending in an axial direction a and configured to supply fluid from a fluid supply 11 to an image forming apparatus 18 (FIG. 1) in a downstream direction ds, a septum receiving chamber 14 formed within the housing member 25 and configured to hold the septum 13 in the radial-compressed state, and the septum 13 in the radial-compressed state disposed within the septum receiving chamber 14. That is, the radial-compressed state of the septum 13 includes forces being applied to the septum 13 in a substantially radial and inward direction i.

Figure 2B:
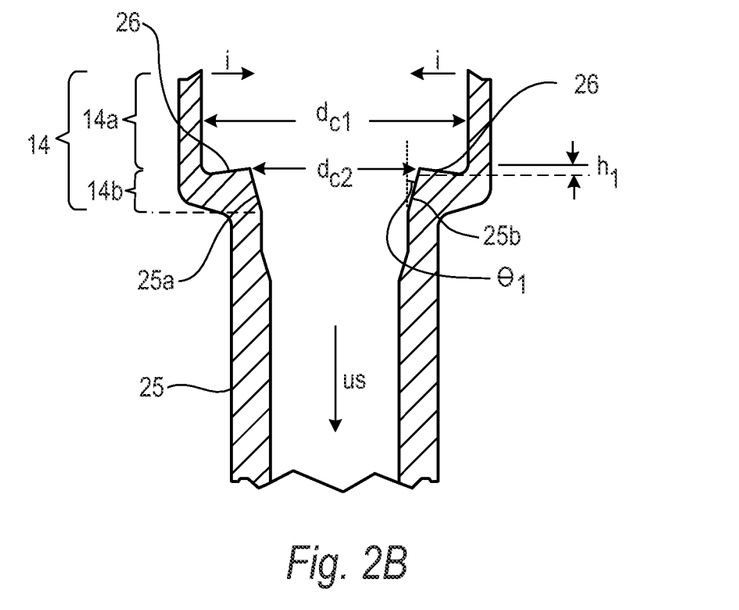
FIG. 2B is a cross-sectional view illustrating a portion of the fluid interconnect system of FIG. 2A without a septum according to an exemplary embodiment of the present general inventive concept.

FIG. 2B is a cross-sectional view illustrating a portion of the fluid interconnect system of FIG. 2A without the septum according to an exemplary embodiment of the present general inventive concept. Referring to FIG. 2B, in this example, the septum receiving chamber 14 may include a first chamber portion 14a having a first chamber diameter $d_{c1}$, a second chamber portion 14b having a second chamber diameter $d_{c2}$ less than the first chamber diameter $d_{c1}$ such that the second chamber portion 14b is disposed upstream from the first chamber portion 14a, and a ledge portion 26 disposed between the first chamber portion 14a and the second chamber portion 14b. Referring to FIG. 2B, the second chamber portion 14b is formed by opposite sidewalls 25a and 25b of the housing member 25 spaced apart by a distance that decreases along the upstream direction us. In an example, each of the opposite sidewalls 25a and 25b form an angle $\Theta_1$ of approximately 15 degrees with respect to a longitudinal axis of the housing member 25 and the ledge portion 26 has an inclined surface increasing in height $h_1$ along the inward direction i.

Figure 2C:
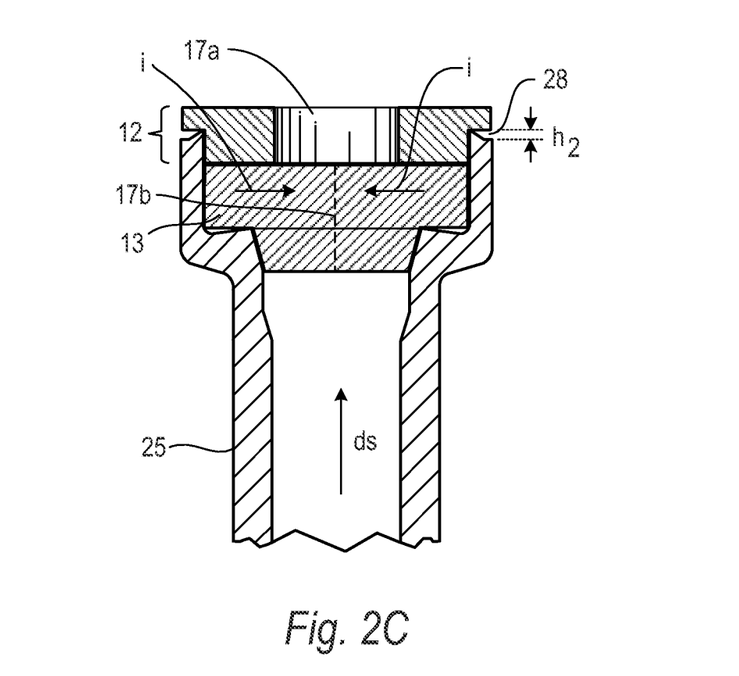
FIG. 2C is a cross-sectional view illustrating a portion of the fluid interconnect system of FIG. 2A including a septum in a radial-compressed state and a septum cap according to an exemplary embodiment of the present general inventive concept.

FIG. 2C is a cross-sectional view illustrating a portion of the fluid interconnect system of FIG. 2A including a septum in a radial-compressed state and a septum cap according to an exemplary embodiment of the present general inventive concept. Referring to 2C, in this example, the fluid interconnect system 10 of FIG. 2A may also include an energy director 28 disposed on an end portion of the housing member 25 and the septum cap 12 disposed downstream of the septum 13 and in contact therewith. For example, the energy director 28 may have a substantially inclined surface having a height $h_2$ which increases along the inward direction i. The energy director 28 is configured to couple to the septum cap 12, for example, through ultrasonic welding. In an example, the septum cap 12 includes plastic material such as polyproprene and/or high density polyethylene. The septum 13 is disposed in the septum receiving chamber 14 (FIG. 2B) in the radial-compressed state. In an example, the septum cap 12 and the septum 13 include a needle receiving portion 17a and 17b configured to receive the needle 19 (FIG. 1) of the image forming apparatus 18 (FIG. 1) to transport fluid to the image forming apparatus 18. In the present example, the needle receiving portion 17a of the septum cap 12 is a hole and the needle receiving portion 17b of the septum 13 is a slit that selectively opens and closes depending on an engagement status of the septum 13 and the needle 19. In an example, the housing member 25 may include a needle receiving portion (not illustrated) such as a hollow cylinder having an opening aligned with the needle receiving portion 17a and 17b of the septum cap 12 and the septum 13. The needle receiving portion of the housing member 25 may be configured to receive the needle 19 of the image forming apparatus 18 therein.

Figure 3A:
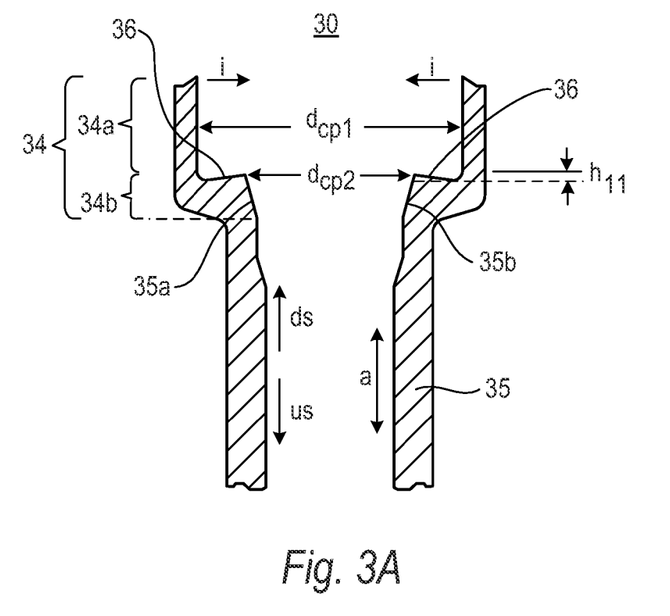
FIG. 3A is a cross-sectional view illustrating a fluid interconnect member usable with an image forming apparatus according to an exemplary embodiment of the present general inventive concept.

FIG. 3A is a cross-sectional view illustrating a fluid interconnect member usable with an image forming apparatus according to an exemplary embodiment of the present general inventive concept. Referring to FIG. 3A, in the present example, a fluid interconnect member includes a housing member 35 extending in an axial direction a and configured to supply fluid from the fluid supply 11 (FIG. 1) to the image forming apparatus 18 (FIG. 1) in a downstream direction ds, and a septum receiving chamber 34 formed within the housing member 35 and configured to hold a septum 33 (FIG. 3B) in a radial-compressed state. In the present example, the septum receiving chamber 34 includes a first chamber portion 34a having a first chamber diameter $d_{cp1}$, a second chamber portion 34b having a second chamber diameter $d_{cp2}$ less than the first chamber diameter $d_{cp1}$; and disposed upstream from the first chamber portion 34a, and a ledge portion 36 disposed between the first chamber portion 34a and the second chamber portion 34b. Also, the second chamber portion 34b has a cross-sectional area that decreases along an upstream direction us. In an example, the ledge portion 36 has an inclined surface increasing in height $h_{11}$ along an inward direction i.

Figure 3B:
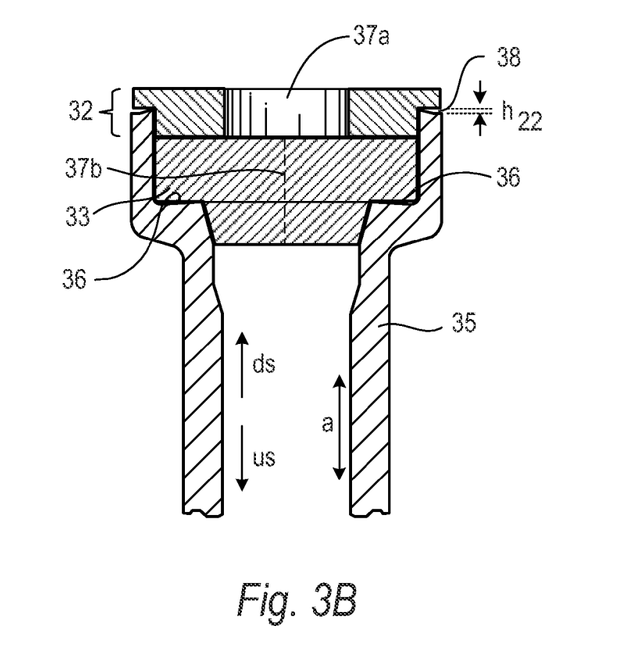
FIG. 3B is a cross-sectional view illustrating the fluid interconnect member of FIG. 3A including a septum in a radial-compressed state and a septum cap according to an exemplary embodiment of the present general inventive concept.

FIG. 3B is a cross-sectional view illustrating the fluid interconnect member of FIG. 3A including a septum in a radial-compressed state and a septum cap according to an exemplary embodiment of the present general inventive concept. Referring to 3B, in this example, a fluid interconnect member of FIG. 3A may also include an energy director 38 disposed on an end portion of the housing member 35 and a septum cap 32 disposed downstream ds of the septum 33 and in contact therewith. For example, the energy director 38 may have a substantially inclined surface having a height $h_{22}$ which increases along the inward direction i. The energy director 38 is configured to couple to the septum cap 32, for example, through ultrasonic welding. In an example, the septum cap 32 includes plastic material such as polyproprene and/or high density polyethylene. The septum 33 is disposed in the septum receiving chamber 34 (FIG. 3A) in the radial-compressed state. In an example, the septum cap 32 and the septum 33 include a needle receiving portion 37a and 37b configured to receive the needle 19 (FIG. 1) of the image forming apparatus 18 (FIG. 1) to transport fluid to the image forming apparatus 18. In the present example, the needle receiving portion 37a of the septum cap 32 is a hole and the needle receiving portion 37b of the septum 33 is a slit that selectively opens and closes depending on an engagement status of the septum 33 and the needle 19. In an example, the housing member 35 may include a needle receiving portion (not illustrated) such as a hollow cylinder having an opening aligned with the needle receiving portion 37a and 37b of the septum cap 32 and the septum 33. The needle receiving portion of the housing member 35 may be configured to receive the needle 19 of the image forming apparatus 18 therein.

Figure 4:
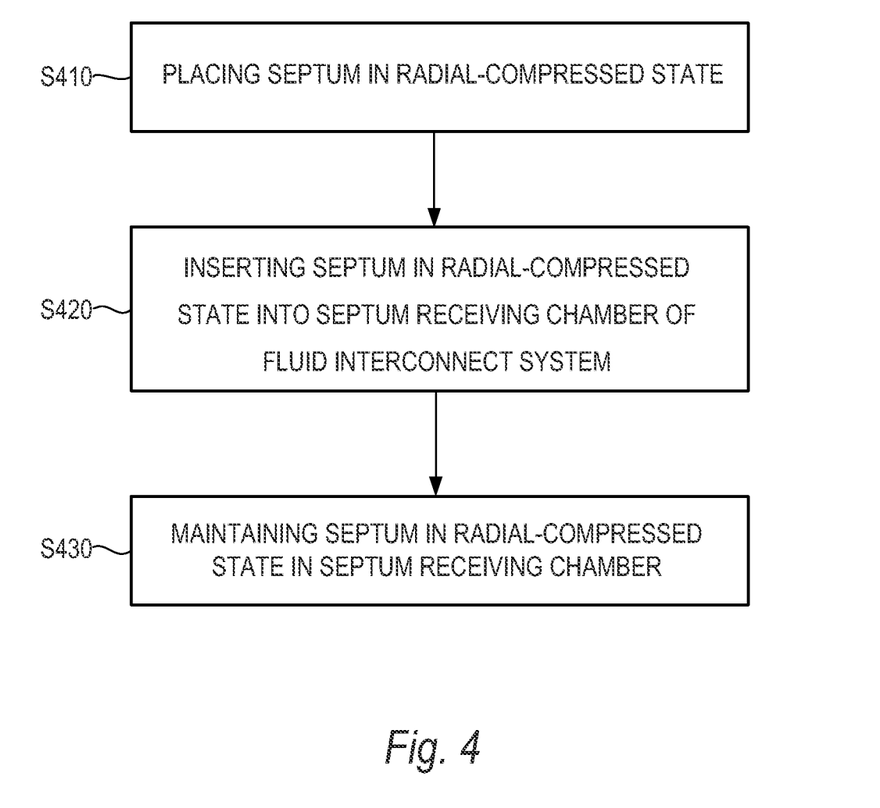
FIG. 4 is a flowchart illustrating a method of assembling a fluid interconnect system according to an exemplary embodiment of the present general inventive concept.

FIG. 4 is a flowchart illustrating a method of assembling a fluid interconnect system according to an exemplary embodiment of the present general inventive concept. Referring to FIG. 4, in block S410, the septum is inserted into a septum receiving chamber of the fluid interconnect system. In examples, the septum may be inserted into the septum receiving chamber in a manual manner, for example, by using an insertion tool and/or in an automated manner, for example, by using robotics. In block S420, the septum is placed in a radial-compressed state during the inserting of the septum into the septum receiving chamber. In block S430, the septum is maintained in the radial-compressed state in the septum receiving chamber. In an example, the radial-compressed state of the septum may be maintained by its contact with a surface of the septum receiving chamber and/or with a septum cap.

Figure 5:
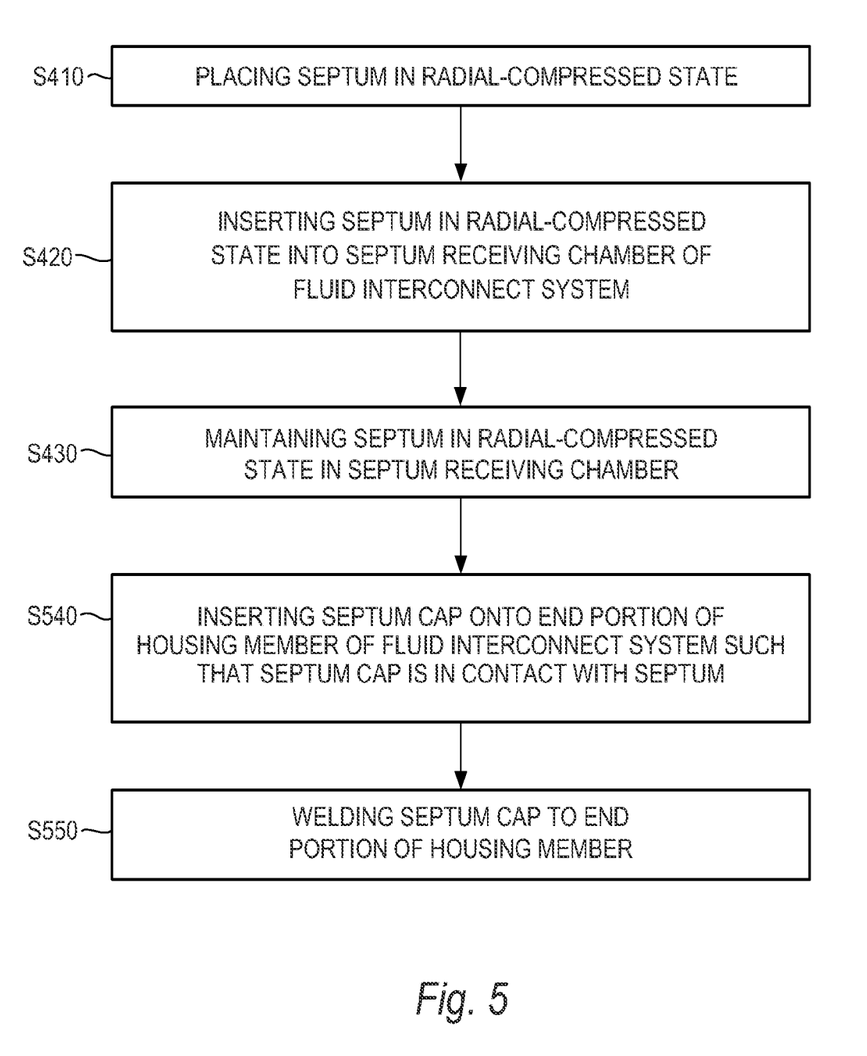
FIG. 5 is a flowchart illustrating a method of assembling a fluid interconnect system according to an exemplary embodiment of the present general inventive concept.

FIG. 5 is a flowchart illustrating a method of assembling a fluid interconnect system according to an exemplary embodiment of the present general inventive concept. FIGS. 6A-6F are sequential views illustrating the methods of assembling a fluid interconnect system of FIGS. 4 and 5 according to exemplary embodiments of the present general inventive concept. In the present example, the method illustrated in FIG. 5 includes the method illustrated in FIG. 4 combined with additional operations. Referring to FIGS. 5 and 6B, in block S410, the septum is inserted into a septum receiving chamber of the fluid interconnect system. In examples, the septum may be inserted into the septum receiving chamber in a manual manner, for example, by using an insertion tool and/or in an automated manner, for example, by using robotics. In block S420, the septum is placed in a radial-compressed state during the inserting of the septum into the septum receiving chamber as illustrated in FIGS. 5 and 6C. In block S430, the septum is maintained in the radial-compressed state in the septum receiving chamber as illustrated in FIGS. 5 and 6D. In block S540, a septum cap is being inserted onto an end portion of a housing member of the fluid interconnect system such that the septum cap is in contact with the septum 13 as illustrated in FIGS. 5 and 6F. In block S550, the septum cap is welded to the end portion of the housing member as illustrated in FIGS. 5 and 6F.

Figure 6A:
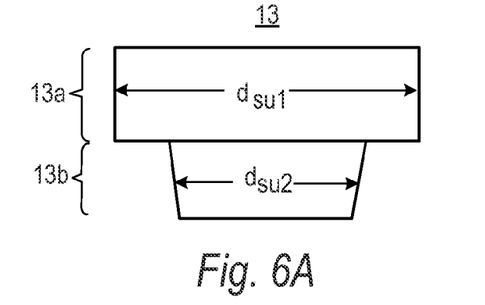
FIGS. 6A-6F are sequential views illustrating the methods of assembling a fluid interconnect system of FIGS. 4 and 5 according to exemplary embodiments of the present general inventive concept.
Figure 6B:
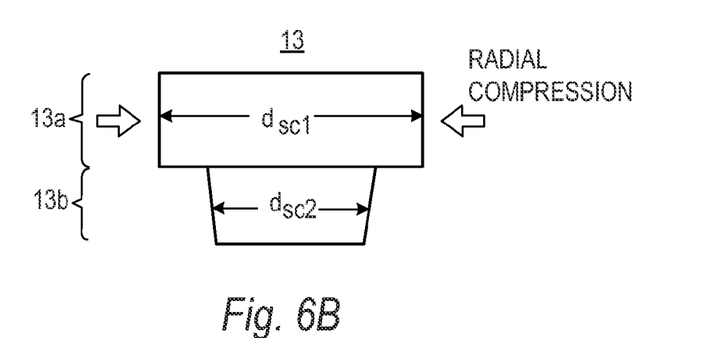
Figure 6C:
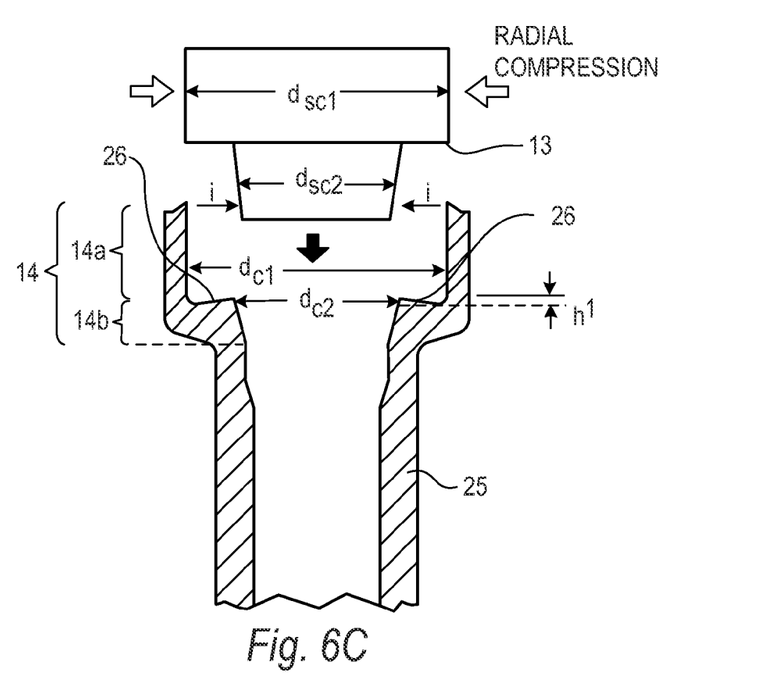
Figure 6D:
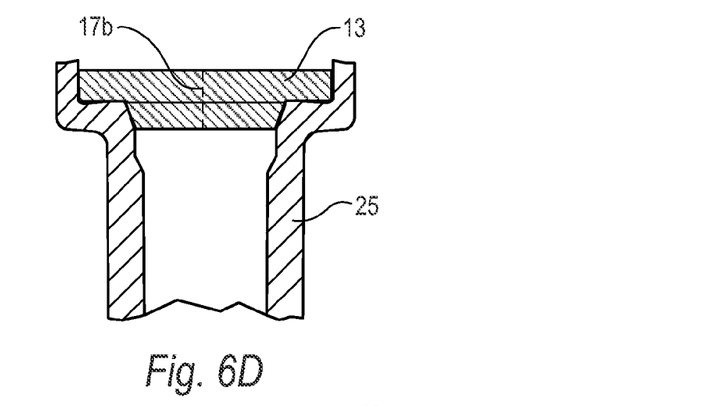
Figure 6E:
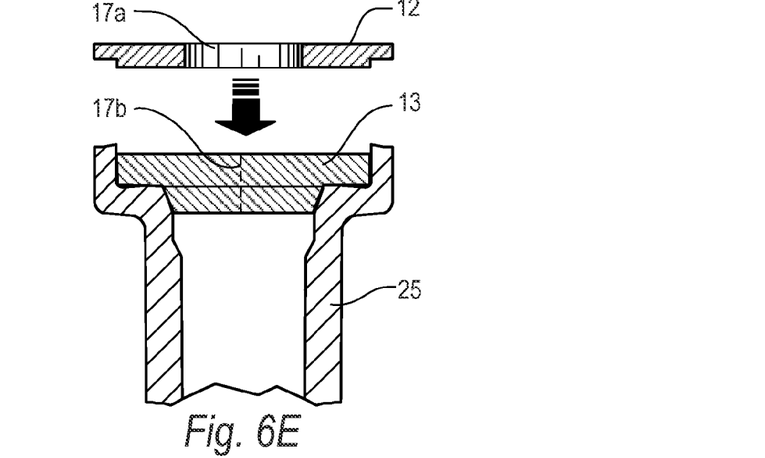
Figure 6F:
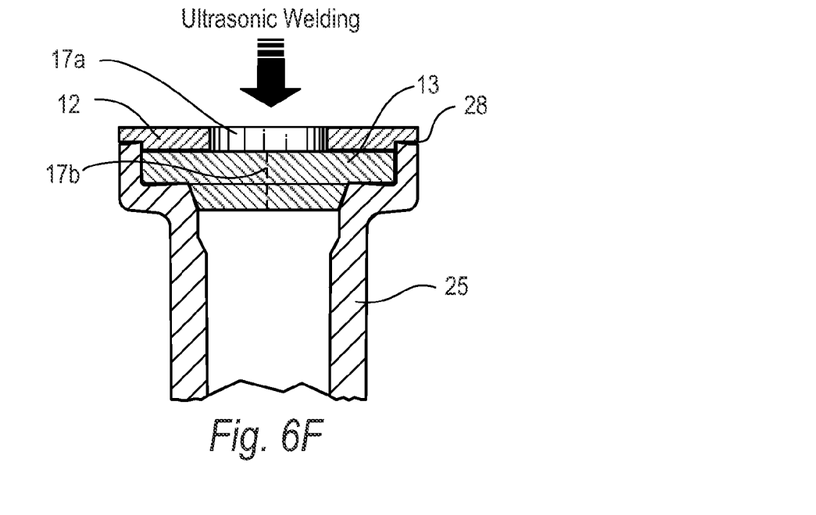

Referring to FIGS. 6A-6F, the septum 13 has a radial-uncompressed state as illustrated in FIG. 6A and a radial-compressed state as illustrated in FIG. 6B. Referring to FIG. 6B, the radial-compressed state of the septum 13 includes a state in which forces are applied to the septum 13 in a substantially inward radial direction such as, for example, surfaces of the septum receiving chamber 14 . Referring to FIG.

6A, the radial-uncompressed state of the septum 13 includes a state in which the septum 13 is not in a radial-compressed state. As illustrated in FIG. 6A, the septum 13 in a radial-uncompressed state includes a first septum portion 13a having a first uncompressed septum diameter $d_{su1}$ and a second septum portion 13b having a second uncompressed septum diameter $d_{su2}$ smaller than the first uncompressed septum diameter $d_{su1}$. In the present example, the second septum portion 13b is disposed adjacent to the first septum portion 13a in both the radial-compressed state and the radial-uncompressed state (FIG. 6B).

Referring to FIG. 6B, the septum 13 in a radial-compressed state includes a first septum portion 13a having a first compressed septum diameter $d_{sc1}$ and a second septum portion 13b having a second compressed septum diameter $d_{sc2}$ smaller than the first compressed septum diameter $d_{sc1}$. In the present example, the first compressed septum diameter $d_{sc1}$ and the second compressed septum diameter $d_{sc2}$ as illustrated in FIG. 6B are respectively smaller than the first uncompressed septum diameter $d_{su1}$ and the second uncompressed septum diameter $d_{su2}$ as illustrated in FIG. 6A.

Referring to FIGS. 6A and 6C, the septum receiving chamber 14 may include a first chamber portion 14a having a first chamber diameter $d_{c1}$ smaller than the first uncompressed septum diameter $d_{su1}$, a second chamber portion 14b having at least a second chamber diameter $d_{c2}$ less than the first chamber diameter $d_{c1}$ and the second uncompressed septum diameter $d_{su2}$, and a ledge portion 26 disposed between the first chamber portion 14a and the second chamber portion 14b and having an inclined surface increasing in height $h_1$ along an inwardly direction i. In this example, the ledge portion 26 creates free space for the septum 13 to over-travel during the insertion operation which allows the septum 13 to be seated evenly in the chamber receiving member 14.

As illustrated in FIG. 6C, the second chamber portion 14b is disposed adjacent to the first chamber portion 14a. Referring to FIG. 6C, the septum 13 is being inserted into a septum receiving chamber 14 of a fluid interconnect system 10 (FIG. 2A). In the present example, the septum 13 is placed in a radial-compressed state during the inserting of the septum 13 into the septum receiving chamber 14. Referring to FIGS. 6B-6D, the first chamber portion 14a is configured to hold the first septum portion 13a of the septum 13 in the radial-compressed state and the second chamber portion 14b is configured to hold the second septum portion 13b of the septum 13 in the radial-compressed state. In FIG. 6E, a septum cap 12 is being inserted onto an end portion of a housing member 25 of the fluid interconnect system 10 (FIG. 2A) such that the septum cap 12 is in contact with the septum 13 as illustrated in FIG. 6F. In an example, the septum cap 12 is welded to the end portion of the housing member 25 as illustrated in 6F. In the present example, the septum cap 12 may be welded to energy director 28 disposed on the end portion of the housing member 25.

The present general inventive concept has been described using non-limiting detailed descriptions of embodiments thereof that are provided by way of example and are not intended to limit the scope of the general inventive concept. It should be understood that features and/or operations described with respect to one embodiment may be used with other embodiments and that not all embodiments of the general inventive concept have all of the features and/or operations illustrated in a particular figure or described with respect to one of the embodiments. Variations of embodiments described will occur to persons of the art. Furthermore, the terms "comprise," "include," "have" and their conjugates, shall mean, when used in the disclosure and/or claims, "including but not necessarily limited to."

It is noted that some of the above described embodiments may describe examples contemplated by the inventors and therefore may include structure, acts or details of structures and acts that may not be essential to the general inventive concept and which are described as examples. Structure and acts described herein are replaceable by equivalents, which perform the same function, even if the structure or acts are different, as known in the art. Therefore, the scope of the general inventive concept is limited only by the elements and limitations as used in the claims.

What is claimed is:

1. A method of assembling a fluid interconnect system, comprising:
    inserting a septum into a septum receiving chamber of a housing member of the fluid interconnect system;
    placing the septum in a radial-compressed state during the inserting the septum into the septum receiving chamber;
    contacting an inner diameter of the septum receiving chamber with an outer diameter of the septum and maintaining the septum in the radial-compressed state in the septum receiving chamber; and
    inserting a septum cap onto an end portion of the housing member, including contacting the septum with the septum cap, contacting the inner diameter of the septum receiving chamber with an outer diameter of a first portion of the septum cap, and extending a flange of a second portion of the septum cap over the end portion of the housing member.

2. The method according to claim 1, further comprising:
    ultrasonic welding the septum cap to the end portion of the housing member.

3. The method according to claim 1, wherein the septum has a radial-uncompressed state and the radial-compressed state, a first septum portion having a first septum diameter, and a second septum portion having a second septum diameter less than the first septum diameter and disposed adjacent to the first septum portion such that the first septum diameter and the second septum diameter are smaller in the radial-compressed state than in the radial-uncompressed state.

4. The method according to claim 3, wherein the septum receiving chamber comprises:
    a first chamber portion having a first chamber diameter less than the first septum diameter in the radial-uncompressed state;
    a second chamber portion having at least a second chamber diameter less than the first chamber diameter and the second septum diameter in the radial-uncompressed state, the second chamber portion disposed adjacent to the first chamber portion; and
    a ledge portion disposed between the first chamber portion and the second chamber portion and having an inclined surface increasing in height along an inwardly direction,
    wherein the first chamber portion is configured to hold the first septum portion of the septum in the radial-compressed state and the second chamber portion is configured to hold the second septum portion of the septum in the radial-compressed state.

5. The method according to claim 1, wherein the septum receiving chamber comprises:
    a first chamber portion having a first chamber diameter; and
    a second chamber portion having a second chamber diameter less than the first chamber diameter, wherein the second chamber diameter is defined at an intersection of a ledge portion having an inclined surface increasing in height along an inward direction and opposite sidewalls diverging along a downstream direction.

6. A fluid interconnect system usable with an image forming apparatus, the fluid interconnect system comprising:
a fluid supply;
a housing member extending in an axial direction, the housing member to supply fluid from the fluid supply to the image forming apparatus in a downstream direction;
a septum receiving chamber formed within the housing member;
a septum disposed within the septum receiving chamber in a radial-compressed state, an outer diameter of the septum fit within and in contact with an inner diameter of the septum receiving chamber; and
a septum cap inserted onto an end portion of the housing member, the septum cap in contact with the septum and an outer diameter of a first portion of the septum cap fit within and in contact with the inner diameter of the septum receiving chamber and a flange of a second portion of the septum cap extended over the end portion of the housing member.

7. The fluid interconnect system according to claim 6, wherein the septum receiving chamber comprises:
a first chamber portion having a first chamber diameter;
a second chamber portion having a second chamber diameter less than the first chamber diameter, the second chamber portion disposed upstream from the first chamber portion; and
a ledge portion disposed between the first chamber portion and the second chamber portion.

8. The fluid interconnect system according to claim 7, wherein the second chamber portion is formed by opposite sidewalls of the housing member spaced apart by a distance that decreases along an upstream direction.

9. The fluid interconnect system according to claim 8, wherein each of the opposite sidewalls form an angle of approximately 15 degrees with respect to a longitudinal axis of the housing member.

10. The fluid interconnect system according to claim 7, wherein the ledge portion has an inclined surface increasing in height along an inward direction.

11. The fluid interconnect system according to claim 6, wherein the septum receiving chamber comprises:
a first chamber portion having a first chamber diameter; and
a second chamber portion having a second chamber diameter less than the first chamber diameter, wherein the second chamber diameter is defined at an intersection of a ledge portion having an inclined surface increasing in height along an inward direction and opposite sidewalls increasing in spacing along a downstream direction.

12. A fluid interconnect member usable with an image forming apparatus, the fluid interconnect member comprising:
a housing member extending in an axial direction, the housing member configured to supply fluid from a fluid supply to the image forming apparatus in a downstream direction;
a septum receiving chamber formed within the housing member and configured to hold a septum in a radial-compressed state and receive a septum cap in contact with the septum, the septum receiving chamber including a first chamber portion having a first chamber diameter, a second chamber portion having a second chamber diameter less than the first chamber diameter and disposed upstream from the first chamber portion, and a ledge portion disposed between the first chamber portion and the second chamber portion;
wherein the second chamber portion has a cross-sectional area decreasing in an upstream direction,
wherein the septum is to be inserted into an end portion of the housing member such that an outer diameter of the septum is in contact with an inner diameter of the first chamber portion of the septum receiving chamber, and
wherein the septum cap is to be inserted onto the end portion of the housing member such that an outer diameter of a first portion of the septum cap is in contact with the inner diameter of the first chamber portion of the septum receiving chamber and a flange of a second portion of the septum cap extends over the end portion of the housing member.

13. The fluid interconnect member according to claim 12, wherein the ledge portion has an inclined surface increasing in height along an inward direction.

14. The fluid interconnect member according to claim 13, further comprising:
an energy director disposed on the end portion of the housing member, the energy director configured to couple to the septum cap.

15. The fluid interconnect member according to claim 13, wherein the energy director is coupled to the septum cap through ultrasonic welding.

16. The fluid interconnect member according to claim 12, further comprising:
the septum disposed in the septum receiving chamber in the radial-compressed state.

17. The fluid interconnect member according to claim 16, further comprising:
the septum cap disposed downstream of the septum and in contact therewith.

18. The fluid interconnect member according to claim 12, wherein the ledge portion has an inclined surface increasing in height along an inward direction, and wherein the second chamber diameter of the second chamber portion is defined at an intersection of the ledge portion and opposite sidewalls of the second chamber portion increasing in spacing along a downstream direction.

* * * * *